July 20, 1926.
J. D. MERRIFIELD
1,593,092
PIPE THREADING TOOL
Filed March 25, 1922
3 Sheets-Sheet 1
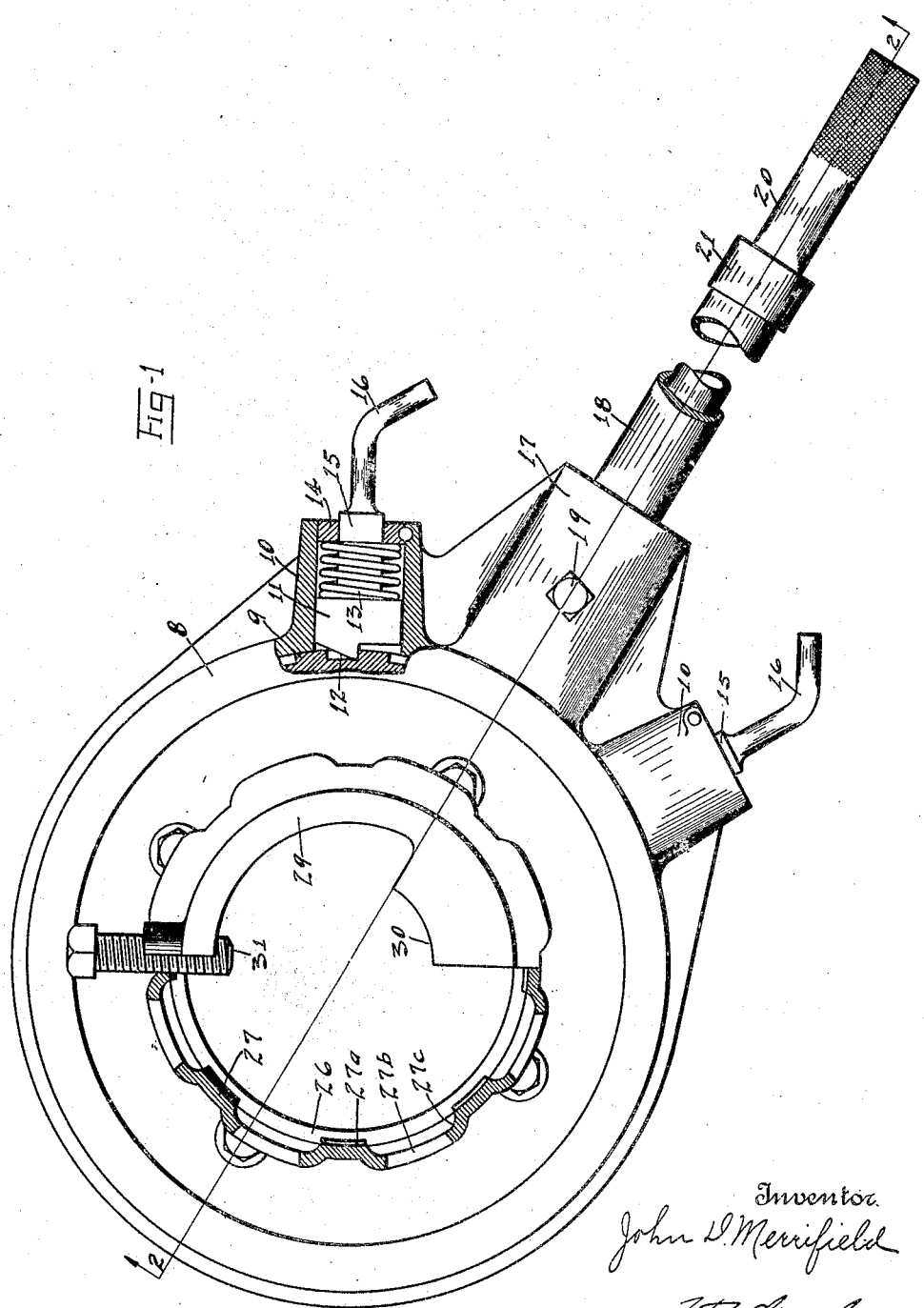

July 20, 1926.
J. D. MERRIFIELD
PIPE THREADING TOOL
Filed March 25, 1922
1,593,092
3 Sheets-Sheet 2
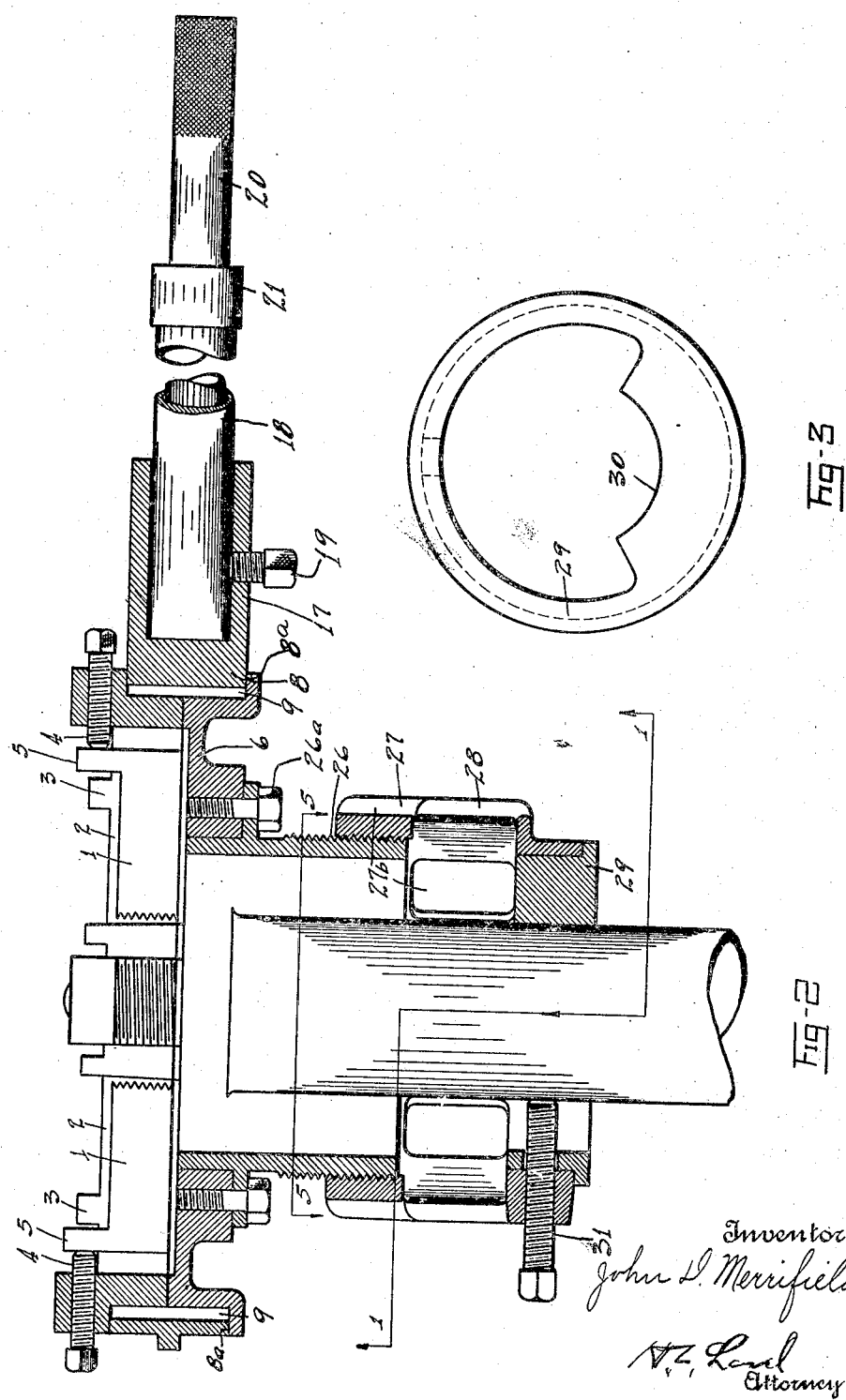

July 20, 1926.
J. D. MERRIFIELD
1,593,092
PIPE THREADING TOOL
Filed March 25, 1922
3 Sheets-Sheet 3
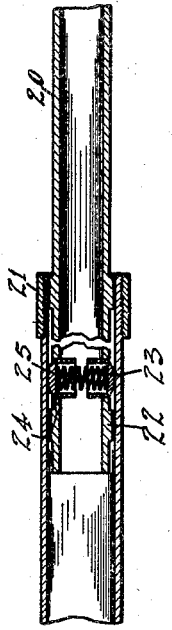
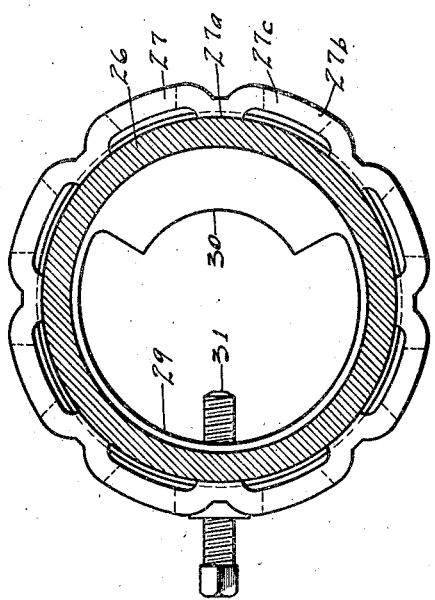
Inventor
John D. Merrifield
Attorney Patented July 20, 1926.

1,593,092

UNITED STATES PATENT OFFICE.

JOHN D. MERRIFIELD, OF ERIE, PENNSYLVANIA, ASSIGNOR TO REED MANUFACTURING COMPANY, OF ERIE, PENNSYLVANIA, A CORPORATION OF PENNSYLVANIA.

PIPE-THREADING TOOL.

Application filed March 25, 1922. Serial No. 546,597.

Hand-operated pipe threading tools require in ordinary sizes of pipe considerable effort and with the larger sizes of pipe it is difficult without making the tool unwieldy to exert manually sufficient effort to complete the thread. The result has been a compromise operating handles slightly longer than is ordinarily desirable and on the other hand shorter than is some times desirable. Further a ratchet drive for such a tool has been found desirable but the pressures vary so in cutting the different parts of the thread, also different sizes of threads, that with a handle of sufficient length to take care of the maximum effort the forward movement for the parts of the thread requiring less effort is so short as to make the operation undesirably slow. One of the features of the present invention is to obviate the difficulties above suggested. With many hand-threading tools a lead screw is provided but difficulty is experienced with such lead screw owing to the fact that the chips coming from the pipe find lodgement within the screw stripping the thread and some times locking the instrument. One of the features of the present invention is to form a lead screw which will yield sufficiently to prevent such locking of the tool and which will provide means by which a chip which is picked up by the thread may be released therefrom. A further feature of the invention relates to the guide for retaining the pipe in alinement with the die. A great deal of pipe as it is cut forms a shoulder or enlargement in different parts of its end and where the guide is a complete annulus the guide must be excessively large or the pipe cannot be entered. Another feature of the present invention is to obviate this difficulty. Other features of the invention will appear from the specification and claims.

The invention is illustrated in the accompanying drawings as follows:—

Fig. 1 shows a side elevation of a thread cutting tool, partly in section, on the line 1—1 in Fig. 2.

Fig. 2 a section on the line 2—2 in Fig. 1.

Fig. 3 an end elevation of the guide ring.

Fig. 4 a section of the operating handle.

Fig. 5 a section on the line 5—5 in Fig. 2.

1 marks the chasers, 2 a guide in the head 3 in which the chasers are mounted, 4 adjusting screws for the chasers, 5 shoulders on the chasers against which the screws operate, 6 a guide plate secured to the head, 8 an operating ratchet ring arranged around the head and guide plate 6, and 9 ratchet teeth arranged in the head and guide plate. The ring 8 is rotatively mounted around the teeth 9 and is held in place by a groove $8^a$ formed in the periphery of the head and guide 6.

Ratchet housings 10 are arranged on the ring 8 and a pawl 11 is slidingly mounted in the housing 10, the pawl being cylindrically shaped and the opening in the housing being cylindrical to receive the pawl, the pawl having a bevelled tooth 12 at its lower end adapted to engage the ratchet teeth 9. A spring 13 is tensioned against the pawl 11 and is held in the housing by a collar 14. A stem 15 extends from the pawl through the collar 14 and is provided with a handle 16 by means of which the pawl may be swung around to reverse the ratchet action. There are preferably two pawls provided and if desired one of the pawls may be swung to oppose the other. Under these circumstances the ring is locked on the head.

A handle socket 17 extends from the ring 8 and a sleeve 18 is secured in the socket by means of a set screw 19. A telescoping rod, preferably in the form of a tube 20 extends into the sleeve 18. A flanged nut 21 is secured to the end of the sleeve 18 and engages the rod 20, the exterior diameter of the rod 20 being slightly less than the interior diameter of the tube. The rod 20 has the shoulders 22 giving it a bearing within the sleeve 18 and the outer shoulder 22 prevents the escape of the rod 20 from the sleeve. In the ordinary use of the device the rod 20 is extended as the necessary turning effort increases and unless it makes a comparatively close fit with the sleeve so that there is not much lost motion and unless it maintains its adjusted position in the sleeve without special attention or effort of the operator the advantage of the device is lost. I provide, therefore, yielding friction pins 23. These are thimble shaped and extend through openings 24 in the rod 20 and are subjected to pressure by a comparatively stiff spring 25. The frictional engagement of the pins 23 is such as to hold the rod 20 in any adjusted position sufficiently to permit of the ready operation at any adjusted position. A lead screw 26 is secured to the guide plate 6 by screws $26^a$ and the lead screw collar 27 is screw-threaded and operates upon the lead screw 26. This collar is fluted at its forward end and the threaded portions 27ª connect with outwardly extending walls 27ᶜ leaving peripheral grooves or openings 27ᵇ next to the thread. Back of the fluted portion the collar is provided with openings 28 so that there is nothing to interfere with an expansion of the collar, or ring, by springing the connecting portions 27ᶜ. With this construction when a chip is picked up by the thread the ring or collar gives sufficiently to prevent the locking of the collar on the lead screw and the chip can escape through the first opening 27ᵇ. In this way one of the great difficulties experienced in the use of lead screws with devices of this kind is obviated.

A guide ring 29 is secured in the rear end of the collar 27. It has a segmental guide socket 30. A screw 31 extends through the collar 27 and the ring 29 into position to complete with the socket 30 a guide for the pipe. By making the guiding surface thus less than continuous a pipe with a slightly enlarged end as clearly shown may, by tilting it, be inserted readily. Ordinarily the enlarged portions are not continuous so that by turning the pipe to parts outside of the socket 30 or screw 31 the pipe may be readily inserted in line. The guide socket is concentric with the die and preferably conforms to the surface of the pipe so that the pipe is accurately centered in the socket.

What I claim as new is:—

1. In a pipe threading tool, the combination of a rotating head; a chaser in the head; a ring on the head; a ratchet driving connection between the head and ring; and a telescoping lever arm on the ring.

2. In a pipe threading tool, the combination of a rotating head; a chaser in the head; a ring on the head; a ratchet driving connection between the head and ring; and a telescoping lever arm on the ring comprising a tube and a rod in the tube, the rod having an enlargement for forming a bearing within the tube and the tube having an internal shoulder forming a stop preventing the disengagement of the rod.

3. In a pipe threading tool, the combination of a chaser; a head in which the chaser is mounted; a telescoping handle for operating the head comprising a tube and a rod slidingly mounted in the tube; and means for yieldingly locking the rod in adjustment in the tube.

4. In a pipe threading tool, the combination of a rotating head; a chaser in the head; a ring on the head; a ratchet driving connection between the head and ring; a telescoping lever arm on the ring comprising a rod slidingly mounted in the arm; and means for yieldingly locking the rod in adjustment in the arm.

5. In a pipe threading tool, the combination of a chaser; a head in which the chaser is mounted; a telescoping handle for operating the head comprising a tube and a rod slidingly mounted in the tube; and means frictionally engaging the inner walls of the tube for yieldingly locking the rod in adjustment in the tube.

6. In a pipe threading tool, the combination of a chaser; a head in which the chaser is mounted; a telescoping handle for operating the head comprising a tube and a rod slidingly mounted in the tube; and means for yieldingly locking the rod in adjustment in the tube, said means comprising opposing pins arranged in and protruding from the rod and an interposed spring forcing the pins into frictional engagement with the tube.

7. In a pipe threading tool, the combination of a chaser; a head in which the chaser is mounted; a telescoping handle for operating the head comprising a tube and a rod slidingly mounted in the tube; and means for yieldingly locking the rod in adjustment in the tube, said means comprising opposing pins arranged in and protruding from the rod and an interposed spring forcing the pins into frictional engagement with the tube, said pins having opposing sockets for receiving the ends of the spring.

In testimony whereof I have hereunto set my hand.

JOHN D. MERRIFIELD.